United States Patent
Touborg

Patent Number: 6,000,145
Date of Patent: Dec. 14, 1999

[54] METHOD AND APPARATUS FOR CONTINUOUS TREATMENT OF PARTICULATE MATERIAL

[75] Inventor: Jorn Touborg, Copenhagen, Denmark

[73] Assignee: F. L. Smidth & Co. A/S, Denmark

[21] Appl. No.: 09/105,808

[22] Filed: Jun. 26, 1998

Related U.S. Application Data

[63] Continuation of application No. PCT/EP96/05666, Dec. 17, 1996.

[30] Foreign Application Priority Data

Feb. 2, 1996 [DK] Denmark ................. 0109/96

[51] Int. Cl.⁶ ........................................ F26B 3/08
[52] U.S. Cl. ............... 34/365; 34/364; 34/360; 34/191; 432/58; 106/743
[58] Field of Search ............... 34/359, 360, 364, 34/365, 191; 432/58, 106, 14; 106/739, 753, 757, 765, 743

[56] References Cited

U.S. PATENT DOCUMENTS

| | | | |
|---|---|---|---|
| 4,759,711 | 7/1988 | Ichiyanagi et al. | 34/365 |
| 4,866,858 | 9/1989 | Delano | 432/58 |
| 4,997,363 | 3/1991 | Hundebol | 432/14 |
| 5,800,610 | 9/1998 | Jons | 106/743 |

FOREIGN PATENT DOCUMENTS

| | | |
|---|---|---|
| 0104282 | 4/1984 | European Pat. Off. . |
| 0240304 | 10/1987 | European Pat. Off. . |
| 0380878 | 8/1990 | European Pat. Off. . |
| 1081400A | 3/1984 | U.S.S.R. . |

OTHER PUBLICATIONS

Database WPI, Section Ch, Week 8521, Derwent Publications Ltd., London, GB; Class J09, AN 85–126786, XP002031491 & SU 1 081 400 A (As Kaza Chem Metal), Mar. 23 1984 (see abstract).

Primary Examiner—Henry A Bennett
Assistant Examiner—Pamela A. Wilson
Attorney, Agent, or Firm—Baker & Botts, L.L.P.

[57] ABSTRACT

A method for the continuous treatment of particulate material, such as cement raw meal, in an apparatus comprising a stationary reactor (6) configured as a conical spouted bed, to which the material is fed and treated in a suspended bed by means of gas which, via a centrally arranged gas inlet (21), is injected at the bottom of the reactor (6) and flows upwards through the reactor (6), and wherefrom the material is discharged via an opening (21) at the bottom of the reactor (6). The dimensions, operating parameters of the reactor (6, 21) or the volumes of the connected apparatuses (8a) are selected and regulated in such a way that during operation the bed pulsates up and down in the reactor (6) at such an amplitude that a quantity of the bed material which corresponds to the quantity of flesh feed material, when the bed is situated in its lowermost position, is brought into a zone (22) in which the gas flow velocity is lower than the minimum velocity required for suspending the bed particles, and thereby drops through the gas flow out of the reactor (6).

11 Claims, 2 Drawing Sheets

METHOD AND APPARATUS FOR CONTINUOUS TREATMENT OF PARTICULATE MATERIAL

This application is a continuation of PCT/EP96/05666 filed Dec. 17, 1996.

BACKGROUND OF THE INVENTION

The invention relates to a method for the continuous treatment of particulate material, such as cement raw meal, in an apparatus comprising at least one stationary reactor configured as a spouted bed, to which the material is fed and treated in a suspension bed by means of gas which, via a centrally arranged gas inlet, is injected at the bottom of the reactor and flows upwards through the reactor, and wherefrom the material is discharged via the gas inlet under gravity against the gas flow at the bottom of the reactor. The invention also relates to an apparatus for carrying out the method.

A method of this kind (hereinafter referred to as of the kind described) is known from our EP-B-0380878. According to this patent specification, the continuous discharge of the product from the stationary reactor takes place in a way whereby finish-burned clinker particles which have attained a size which exceeds a pre-determined limit passes through the gas inlet in counter-current to the suspension gas, under the influence of gravitational force.

A disadvantage of this known method of discharge is that it does not ensure that a desired amount of material is constantly maintained in the reactor since a change in the material feed rate does not automatically lead to a corresponding change in the material discharge rate. In an apparatus utilizing this method of discharge it will, therefore, be difficult to obtain optimum retention time of the clinker in the reactor in terms of reaction and energy characteristics. Practical experience with the aforementioned method indicates that, subject to certain operating conditions, all of, or an undesirably great portion of, the bed is either pulled downwards all at once, resulting in a complete or partial discharge of the reactor, or is expanded upwards in the reactor. A further disadvantage of the method is that it can only be utilized for reaction processes in which a continuous increment in the weight of the particles in the bed takes place.

SUMMARY OF THE INVENTION

It is the object of the present invention to provide a method and thus an apparatus which will ensure that a desired amount of material is constantly maintained in the reactor.

According to the invention this is achieved by a method of the kind described characterized in that the dimensions and operating parameters of the reactor and the connected apparatus volumes are selected and controlled in such a way that during operation the bed is caused to pulsate up and down in the reactor in a controlled manner at such an amplitude that a quantity of the bed material corresponding to the quantity of fresh feed material is, when the bed is situated in its lowermost position, brought into a zone in which the gas flow velocity is lower than the minimum velocity required for suspending the bed particles, whereby that quantity of the bed material drops through the gas flow out of the reactor.

In tests carried out by the applicant at a test plant which is essentially of the kind described in the aforementioned patent, it has been found that a part of the cement clinker is discharged from the reactor long before the clinker particles have the sufficient size to overcome the suspension gas flow exclusively by means of gravitational force. It has also emerged that changes in the gas velocity of up to 50% have only a moderate effect on the size of the clinker particles being discharged from the reactor.

More detailed examination has indicated that the clinker discharge from the reactor takes place intermittently and, concurrently with that, the entire bed, or a part of the bed in the vicinity of the gas inlet, jumps upwards and downwards in the reactor. Furthermore the particle size distribution of the material discharged from the reactor is essentially equivalent to that of the material retained in the reactor.

So, there is no doubt that the suspended bed may be brought to pulsate upwards and downwards in the reactor, and that clinker in this way can be discharged from the reactor.

Pulsation in suspended beds, such as spouted beds, is not unknown to experts within this field, but, up to now, pulsation has been regarded as a phenomenon which should preferably be avoided. Specialist literature seems to indicate that no-one has carried out any detailed studies of the pulsation phenomenon in order to identify the underlying cause(s) of pulsation. By contrast, there are numerous descriptions of suitable methods which can be used to avoid pulsation.

From the tests conducted by the applicant it appears that the pulsation is caused by a number of interacting factors. In this context, a factor of particular significance is the relationship between the weight of the suspended bed and the elastic and inertial forces resulting from the air volumes present above and below the bed in the reactor as well as in the connected apparatuses. Other determinant factors for the behaviour of the bed are the fan characteristic, the dimensions of the gas inlet duct, the angle of the conical section of the reactor and the operating parameters, such as the average gas mass flow rate, the average gas velocity, the material velocity and the temperature in the reactor as well as in the gas inlet duct.

Proper selection and regulation of the aforementioned factors will enable any expert within this field to achieve a steady mode of operation with desirable pulsation characteristics.

For example, by adapting the air volumes in the connected apparatuses to the desired bed suspension and gas flow, the frequency and amplitude of the pulsation of the suspended bed may be modulated in such a way that the amplitude will have exactly the size needed to ensure that a desired portion of the bed material, when the bed is situated in its lowermost position, is brought into a zone in which the gas flow velocity is lower than the minimum velocity necessary for suspending the bed particles, and thereby drops through the gas flow out of the reactor. Because the amplitude will increase as the mass of the suspended bed is increased, the amount of material discharged in this way from the reactor will increase as the mass of the suspended bed increases. As a result, the mass of the suspended bed will be stabilized within a very limited range, and, furthermore, it will adjust itself to the selected operating parameters.

It is thus achieved by the method according to the invention that a desired amount of material is constantly maintained in the reactor in that a change in the material feed rate automatically leads to a similar change in the material discharge rate. This makes it easier to control the retention time of the material in the reactor in comparison with previously known methods, thereby resulting in a more uniform retention time of the material and thus ensuring optimization of reaction and energy characteristics. The method can also be utilized for processes in which no continuous increment of the weight of the particles in the bed takes place.

In actual practice, the dimensions and operating parameters of the reactor as well as the volumes of the connected apparatuses may be used as variable controlling parameters, either individually or in combination.

Hence, one may choose to regulate the longitudinal and/or the diametrical dimensions of the gas inlet duct of the reactor. This is most simply done prior to start-up by means of one or several insertion sections having the desired dimensions, and fitted in the gas inlet duct, but may also be done during operation by use of suitable means such as insertion sections of variable lengths and/or diameters. In practice it has proved to be advantageous if the relationship between the length and diameter of the gas inlet can be regulated within a range of 0.5–6.

One may also choose to regulate during operation at least one of the operating parameters, such as the average gas mass flow rate, the average gas velocity, the material flow, the reactor temperature, and the inlet duct temperature. If the average gas velocity is selected as a regulating parameter, this velocity should, in the narrowest part of the gas inlet, be regulated within a range which is between 1 to 10 times the terminal velocity of a particle of mean size in the material which is discharged from the reactor.

Typically, the reactor is incorporated as a part of a larger plant, in which the reactor is directly connected to other apparatuses, and if this is the case the pulsation of the bed in the reactor may also be regulated by adjusting the volume of at least one of the connected apparatuses during operation. Hence it will be possible to adjust the elastic force of the particular apparatus, which will affect the frequency and amplitude of the pulsation, in such a way that the desired pulsation characteristics are obtained.

In certain cases it would be desirable if a fraction, typically the finest fraction of the material which is discharged from the reactor, could be recirculated to the reactor. This may be desirable if the retention time of this material fraction in the reactor is deemed to be inadequate. Therefore, by the method according to the invention, it is possible to classify the material discharged from the reactor, and also to recirculate the desired fraction of classified material to the reactor. The classification may be carried out in the form of air separation which entails the material being led through a substantially vertical duct countercurrent to the suspension gas, with the gas velocity in the duct being maintained within a range which is 0.1 to 1 times the terminal velocity of a particle of mean size in the material contained in the bed.

The invention also relates to an apparatus for carrying out the method according to the invention, the apparatus comprising at least one pre-treatment unit, at least one stationary reactor consisting of an upright cylindrical vessel provided at its lower end with a frusto-conical wall, the bottom of which is in open and direct connection with the upper part of a post treatment unit through a common vertical, central duct for simultaneous passage of suspension gas from the post treatment unit to the reactor and discharged material from the reactor to the post treatment unit, the reactor also being provided with one or several inlets for pre treated material, and being characterized in that it comprises means for regulating the pulsation amplitude of the bed in a controlled manner.

BRIEF DESCRIPTION OF THE DRAWINGS

The invention will now be described in further details with reference to the attached diagrammatic drawings, in which.

DESCRIPTION OF THE PREFERRED EMBODIMENTS

Figure 1:
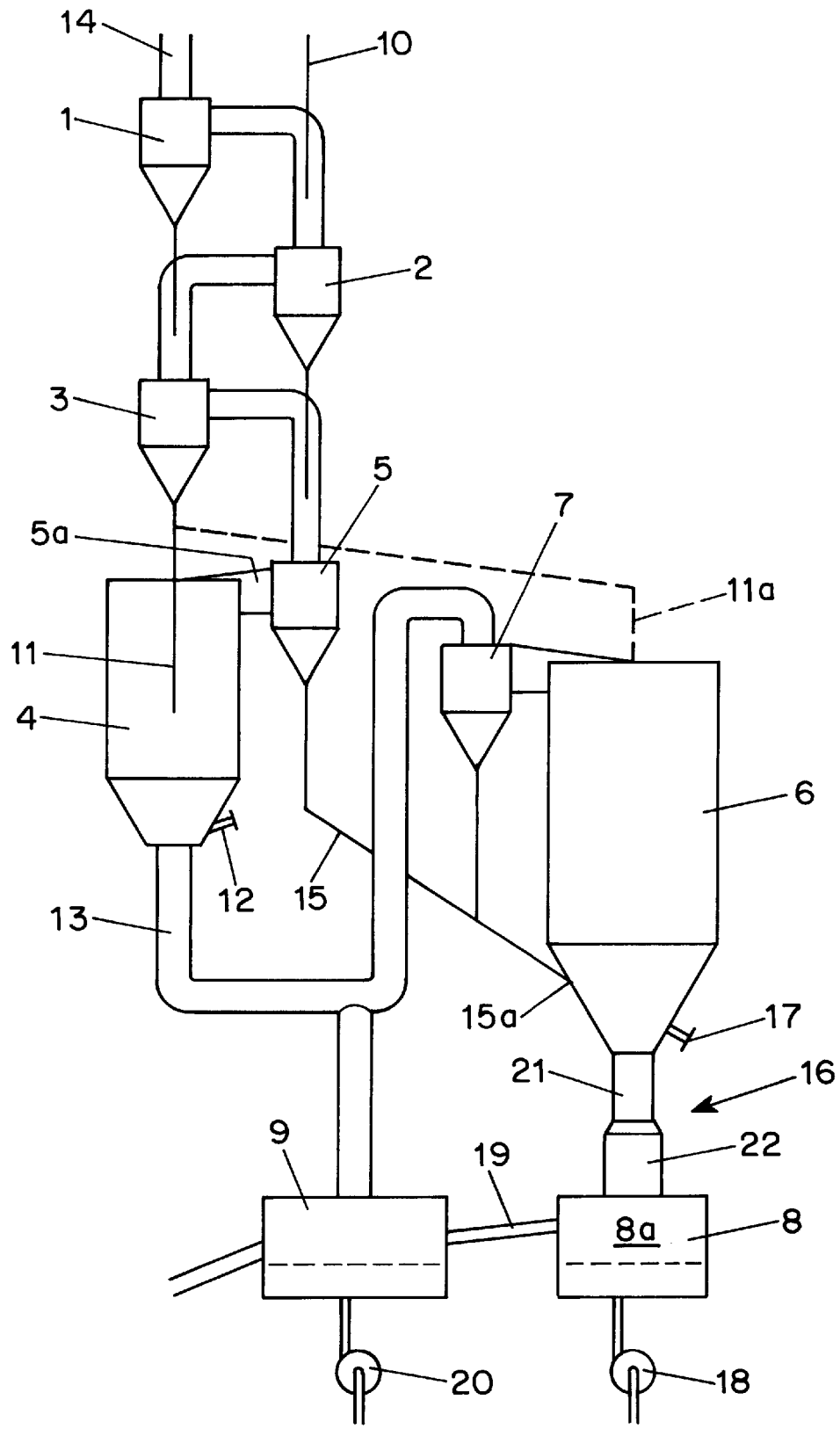
FIG. 1 shows in side view an example of an apparatus according to the present invention; and, FIG. 2 is a partly sectional view, showing, to a larger scale, a part of the apparatus depicted in FIG. 1.

FIG. 1 shows a plant for manufacturing cement clinker comprising a suspension preheater which consists of three cyclone stages 1, 2, and 3, a calciner 4 with a separating cyclone 5, a stationary reactor 6 equipped also with a separating cyclone 7, a first clinker cooler 8 and a second clinker cooler 9.

Cement raw meal is supplied to the plant at an inlet 10 and is conveyed in known manner through the preheater cyclones 1, 2 and 3 to the calciner 4 through a duct 11. The calciner is fed with fuel at an inlet 12 and combustion air via a duct 13 from both the separating cyclone 7 of the reactor 6 and the second cooler 9.

In the calciner 4 the preheated raw meal is calcined in known manner in suspension, and the suspension of exhaust gas and calcined raw meal is conveyed via an outlet 5a to the separating cyclone 5, wherefrom the exhaust gas is led up to the preheater 1, 2 and 3, and, subsequently, the gas is discharged from the plant via a gas outlet 14. The separated calcined raw meal is led from the separating cyclone 5 to the reactor 6 via a duct 15 and a material inlet 15a. The plant may also comprise a duct 11a for diverting a portion of the preheated raw meal past the calciner 4 directly to the top of the reactor 6, where it is introduced and mixed with the exhaust gases from the reactor 6 in order to lower the temperature in this zone so that cakings in the separating cyclone 7 are avoided.

The reactor 6, which is configured as a conical spouted bed, is supplied with combustion and suspension air from the first cooler 8 via a duct 16 and with fuel via an inlet 17. The finish-burned clinker is discharged from the reactor 6 and led via the duct 16 to the cooler 8 in counter-current to the cooling air which is fed to and through the cooler 8 by means of a fan 18. From the first cooler 8 the clinker is led on, via a duct 19, into the second cooler 9 which is fed with cooling air by means of a fan 20.

The duct 16 consists of a gas inlet section 21 closest to the reactor 6 and an underlying separating section 22 having a greater cross sectional area. In principle, the duct 16 may be of any cross-sectional form, although it is usually substantially circular.

The dimensions and operating parameters of the reactor 6 and the volumes of the connected apparatuses, such as the freeboard volume 8a of the underlying cooler 8, are selected prior to start-up of the plant to carry out the intended assignment based on previous operational experience so as to ensure upward and downward pulsation of the bed in the reactor 6 during operation. At start-up, and possibly at a subsequent stage during operation, the pulsation amplitude is modulated so that for each pulsation cycle the bed is moved downwards to such an extent that a desired portion of the bed material is brought into the separating section 22 of the duct 16 in which the gas flow velocity is lower than the minimum velocity required for suspending the bed particles, and thereby drops through the gas flow out of the reactor 6, whereas the remaining portion of the bed rises back into the reactor 6.

Figure 2:
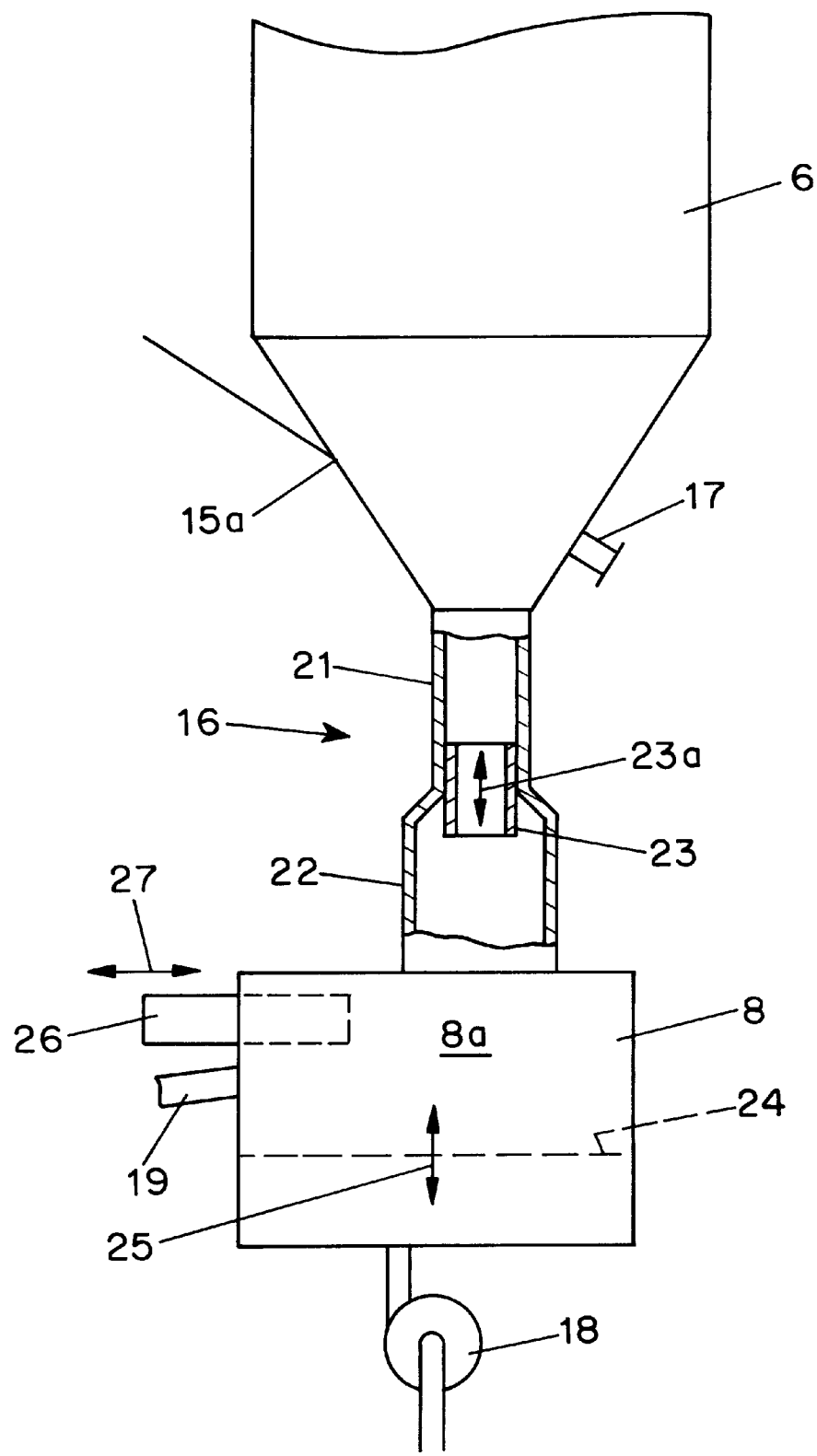

FIG. 2 shows examples of means which may be utilized for regulating the pulsation of the bed. The duct (16) below the gas inlet section (21) may include an air separation section (22) with a length/diameter relationship between 1 and 10. The length of the gas inlet section 21 may be regulated by means of a pipe section 23 which is placed telescopically in the gas inlet section 21, and is displaceable upwards and downwards as indicated by the double arrow 23*a*. In plants in which the operating temperature is low in contrast to the plant shown, the diameter of the gas inlet section 21 may e.g. be regulated by means of a tubular bellows means, not shown. Several methods may be used for regulating the freeboard volume 8*a* of the cooler 8. For example, the grate bottom 24 of the cooler may be raised and lowered, as indicated by the double arrow 25, or a filling element 26 may be fitted displaceably in and out of the cooler 8, as indicated by the double arrow 27. Another method involves regulation of the clinker volume in the cooler 8 by adjusting the discharge rate in relation to the feed rate. Regulation of the gas flow and gas velocity up through the duct 16 and the reactor 6 can be carried out by means of the blower 18, whereas the regulation of the material flow to the reactor 6 can be effected by adjusting the material flows in the ducts 10, 11 and 11*a*. The reactor temperature can be regulated by adjusting the fuel supply via the inlet 17, whereas the temperature in the gas inlet duct 16 can be adjusted downwards and upwards by addition of cold air or firing of fuel in the cooler freeboard 8*a* or in the duct proper, respectively.

The plant according to the invention may incorporate several reactors 6 which are arranged in parallel. The reactors 6 may be individually connected to separate pre treatment units, they may be connected in groups to several pre-treatment units, or they may be connected to one and the same pre-treatment unit. The reactors 6 may also be individually connected to separate post-treatment units, they may be connected in groups to several post treatment units, or they may be connected to one and the same post treatment unit. In a preferred embodiment the reactors 6 are connected to one and the same pre treatment unit and to separate post treatment units.

I claim:

1. A method for the continuous treatment of particulate material in an apparatus comprising at least one stationary reactor configured as a spouted bed, to which the material is fed and treated in a suspended bed by means of gas which, via a centrally arranged gas inlet section, is injected at the bottom of the reactor and flows upwards through the reactor, and wherefrom the material is discharged via the gas inlet under gravity against the gas flow at the bottom of the reactor, characterized in that the dimensions and operating parameters of the reactor and the connected apparatus volumes are selected and controlled in such a way that during operation the whole bed is caused to pulsate up and down in the reactor in a controlled manner at such an amplitude that a quantity of the bed material corresponding to the quantity of fresh feed material is, when the bed is situated in its lowermost position, brought into a zone in which the gas flow velocity is lower than the minimum velocity required for suspending the bed particles, whereby said corresponding quantity of the bed material drops through the gas flow out of the reactor.

2. A method according to claim 1, wherein at least one of the longitudinal and diametrical dimensions of the gas inlet of the reactor are regulated during operation.

3. A method according to claim 2, wherein the relationship between the length and diameter of the gas inlet is regulated within a range of 0.5–6.

4. A method according to claim 1, wherein at least one of the operating parameters, average gas velocity, average gas mass flow rate, material flow, reactor temperature, and gas inlet duct temperature is regulated during operation.

5. A method according to claim 4, wherein the gas velocity in the narrowest part of the gas inlet is regulated within a range which is between 1 and 10 times the terminal velocity of a particle of mean size in the material extracted from the bed.

6. A method according to claim 1, wherein the volume of at least one apparatus connected to the reactor is regulated during operation.

7. A method according to any one of the claims 1 to 6, wherein the material discharged from the reactor is classified, and in that the finest fraction of the classified material is recirculated to the reactor.

8. A method according to claim 7, wherein the classification is carried out in the form of an air separation which entails the material being led through a substantially vertical duct in counter-current to the suspension gas, with the gas velocity in the duct being maintained within a range which is 0.1 to 1 times the terminal velocity of a particle of mean size in the material retained in the bed.

9. Apparatus for carrying out the method according to claim 1, the apparatus comprising at least one pre-treatment unit, at least one stationary reactor consisting of an upright cylindrical vessel provided at its lower end with a frustoconical wall, the bottom of which is in open and direct connection with an upper part of a post treatment unit through a common vertical, central duct for simultaneous passage of suspension gas from the post treatment unit to the reactor and discharged material from the reactor to the post-treatment unit, the reactor being provided also with at least one inlet for pre-treated material, characterized by means for regulating the pulsation amplitude of the whole bed in a controlled manner, wherein the regulating means comprises at least one of means for regulating at least one of the longitudinal or diametrical dimensions of the gas inlet section of the duct or means for regulating the volume of at least one apparatus connected to the reactor.

10. An apparatus according to claim 9, wherein the regulating means comprises means for regulating the operating parameters of the reactor.

11. An apparatus according to any one of claims 9 or 10, wherein the duct below the gas inlet section comprises an air separation section, with a relationship between length and diameter of between 1 and 10.

\* \* \* \* \*